(No Model.)
A. J. CORCORAN.
WINDMILL.
No. 411,581. Patented Sept. 24, 1889.
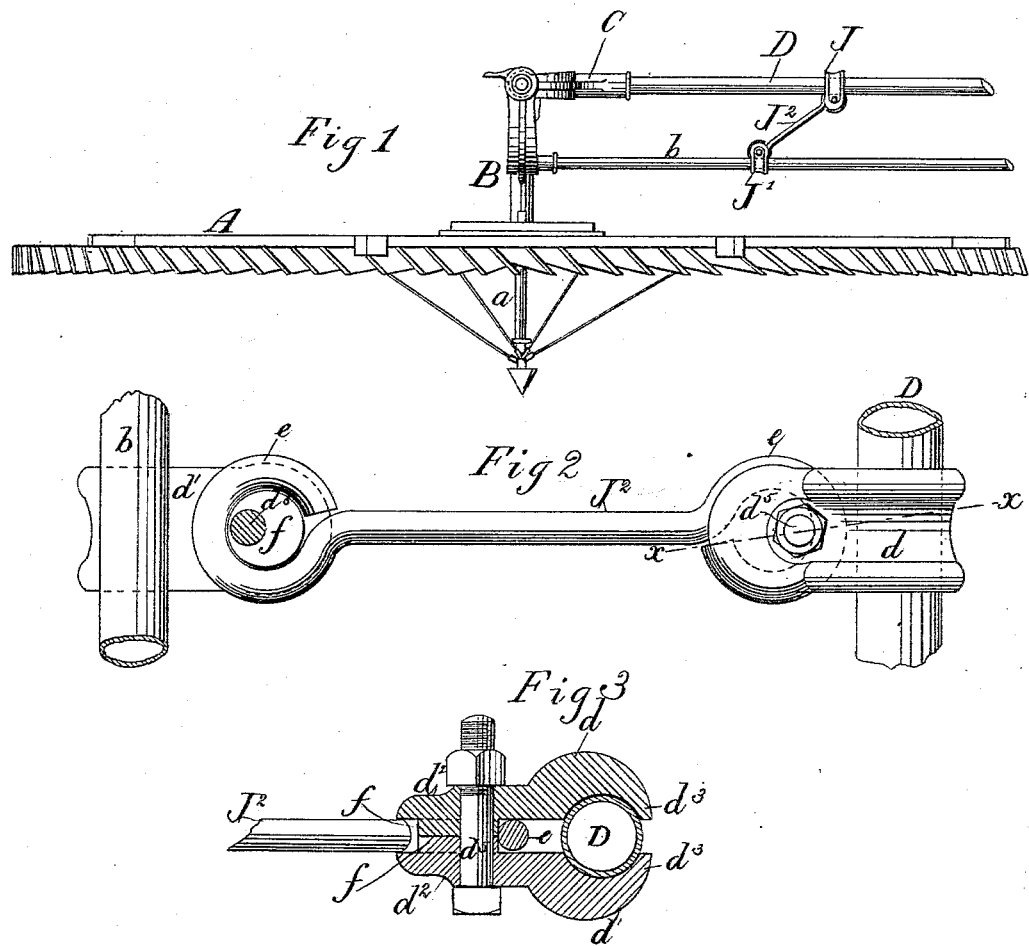
Witnesses
John Bickett
Arthur H. Gamblin
Inventor
Andrew J. Corcoran
By his Attorneys
Broward Griswold

UNITED STATES PATENT OFFICE.

ANDREW J. CORCORAN, OF JERSEY CITY, NEW JERSEY.

WINDMILL.

SPECIFICATION forming part of Letters Patent No. 411,581, dated September 24, 1889.

Application filed November 15, 1888. Serial No. 290,877. (No model.)

*To all whom it may concern:*

Be it known that I, ANDREW J. CORCORAN, of Jersey City, in the county of Hudson and State of New Jersey, have invented a new and useful Improvement in Windmills, of which the following is a specification.

My improvement relates to that class of windmills in which, upon an increase in the force of the wind, the wind-wheel will be deflected from a position facing the direction of the wind to one at a greater or less angle with the direction of the wind. In such windmills it becomes essential when it is not desired to use the mill for any considerable length of time to so secure the tail-vane bend that it will occupy a position approximately parallel with the wind-wheel, in order to present an edge of the wheel always to the wind, so that the wheel may not be damaged by being blown in strong or severe gales.

My improvement consists in means hereinafter to be described for securing the tail-vane in such position.

In the accompanying drawings, Figure 1 is a plan or top view of a portion of a windmill sufficient to illustrate my improvement. Fig. 2 is a detail view, on an enlarged scale, of a lock for securing the tail-vane in position. Fig. 3 is a view on the same scale as Fig. 2, showing a section of a portion of the lock taken on the plane of the line $x\,x$, Fig. 2.

Similar letters of reference designate corresponding parts in all the figures.

A designates the wind-wheel mounted centrally upon a shaft $a$. The shaft $a$ is journaled in a main frame B.

Extending from the main frame B, and rigidly secured near one end thereto in such position as to be approximately parallel with the wheel A, is a rod $b$ for a side vane. (Not shown.)

C designates the tail-piece pivotally connected to the main frame B. In the tail-piece C is secured one end of a tail-bar D for a tail-vane. (Not shown.) The tail-piece C may be swung upon its pivot so as to bring it at approximately right angles to the main frame B and into a position where it and the tail-vane will be approximately parallel with the wind-wheel. It is obvious that when in such a position the wind-wheel will always be presented with its edge to the wind. In order to lock the tail-vane in the position last referred to, I employ a lock consisting of two clamps J J', connected by a connecting bar or rod $J^2$. In the example shown the clamp J is clamped to the tail-bar D, and the clamp J' is clamped to the side-vane bar $b$.

I have shown a convenient form of clamp and connecting-bar more clearly in Figs. 2 and 3. Each of the clamps is composed of two sections $d\,d'$. Each of the sections comprises a shank portion $d^2$ and a gripper-jaw $d^3$. The gripper-jaws are adapted to be passed about the bar to be gripped, and may be secured tightly upon such bar by means of a bolt $d^5$. The bolt $d^5$ not only serves to cause the gripping of the jaws, but it also serves to secure the connecting rod or bar $J^2$ to the gripper and at the same time to cause the shank portions $d^2$ to grip the connecting rod or bar and so hold it in any position into which it may be adjusted.

I have shown the end portions of the connecting rod or bar $J^2$ as bent so as to form loops $e$. Upon the inner sides of the shanks $d^2$ are cylindrical bosses or hubs $f$, the faces of which will meet, or approximately meet, when the shanks are brought together by the bolts. The diameter of these bosses or hubs is somewhat less than the internal diameter of the loops $e$ on the connecting-rod, so that the connecting-rod may be turned about the bosses or hubs before being gripped and locked into position.

I have shown the bolts as passing through apertures in said bosses or hubs which are eccentric to the axes of the bosses or hubs, and which apertures are formed in those portions of the bosses or hubs nearest the jaws $d^3$. By this means the clamping-bolts are brought nearer to the jaws.

In Fig. 1 I have shown the bars D $b$ locked together. In this instance the rod $J^2$ is shown as extending at an incline between the clamps J J'. This is occasioned by the connecting-bar being made of somewhat greater length than the distance between the bars D $b$. The bar is illustrated as occupying this position in order to show that by adjusting the grippers J J' into positions nearer to or farther from each other the lock may be accommodated to windmills of different sizes and makes, in which the distance between the tail-vane bars and side-vane bars may vary. The clamps having been adjusted into proper position upon the bars of the parts may then be rigidly secured together by means of the bolts $d^5$.

What I claim as my invention, and desire to secure by Letters Patent, is—

1. In a windmill, the combination, with the wind-wheel, of a tail-vane bar so supported as to be movable into a position approximately parallel with the wind-wheel, a side-vane bar, and a rigid detachable lock for securing the tail-vane bar and the side-vane bar together, substantially as specified.

2. In a windmill, the combination, with a wind-wheel, of a tail-vane bar so supported as to be movable into a position approximately parallel with the wind-wheel, a side-vane bar also approximately parallel with the wind-wheel, and a lock for securing said bars together, consisting of two clamps and a connecting bar or rod between the clamps, substantially as specified.

3. A lock for securing together the tail-vane bar and the side-vane bar of a windmill, consisting of two clamps adapted to grip said bars, a connecting-rod extending between said clamps, and bolts by which not only are the clamps caused to grip the bars, but also by which the clamps are caused to grip the connecting-rod, substantially as specified.

4. A lock for securing together a tail-vane bar and a side-vane bar of a windmill, consisting of jaws adapted to grip said bars, and provided with shank portions, bosses, or hubs upon the inner sides of said shanks, a connecting-rod provided with loops near its ends through which said bosses or hubs extend when the shanks are brought together, and bolts extending through said bosses or hubs and adapted to secure the connecting-rod and to cause the clamps to grip the said bars, substantially as specified.

5. In a lock for securing together the tail-vane bar and the side-vane bar of a windmill, the combination of gripper-jaws provided with shanks, hubs, or bosses upon the inner sides of said shanks, a connecting-rod provided with loops near its ends receiving said hubs or bosses when the shanks are brought together, said hubs or bosses being provided with apertures eccentric to their axes and in the portions thereof nearer said jaws, and bolts passing through said apertures for securing the jaws about said bars and causing the shanks to grip the loops of the connecting-rod, substantially as specified.

ANDREW J. CORCORAN.

Witnesses:
 FREDK. HAYNES,
 ARTHUR H. GAMBLIN.